United States Patent [19]
Crumley

[11] Patent Number: 6,065,852
[45] Date of Patent: May 23, 2000

[54] ILLUMINATED RAILING SYSTEM

[76] Inventor: Harold E. Crumley, 212 Bluff St., Crawfordsville, Ind. 47933

[21] Appl. No.: 09/190,573

[22] Filed: Nov. 12, 1998

[51] Int. Cl.[7] .................................................... F21V 33/00
[52] U.S. Cl. .......................... 362/146; 362/576; 362/152; 362/551
[58] Field of Search .................................... 362/551, 576, 362/146, 152, 31

[56] References Cited

U.S. PATENT DOCUMENTS

| | | | |
|---|---|---|---|
| 2,479,500 | 8/1949 | Longberg | 362/576 |
| 3,057,991 | 10/1962 | Grenadier | 362/146 |
| 3,569,689 | 3/1971 | Nestrock | 362/146 |
| 5,701,236 | 12/1997 | Viviano | 362/576 |

Primary Examiner—Sandra O'Shea
Assistant Examiner—Ismael Negron

[57] ABSTRACT

A illuminated railing system for locating a hand railing in low light conditions. The illuminated railing system includes a plurality of posts including at least one end post and at least one middle post. The end post has an opening adjacent the upper end of the end post. The middle post has a pair of opposite openings adjacent the upper end of the middle post. One end of a generally transparent hand railing is inserted into the opening of the end post. Another end of the hand railing is inserted into one of the openings of the middle post. A plurality of elongate optical fibers are extended through the hand railing between the ends of the hand railing. The end post has a light source mounted therein adjacent opening of the end post.

14 Claims, 5 Drawing Sheets

ILLUMINATED RAILING SYSTEM

BACKGROUND OF THE INVENTION

1. Field of the Invention

The present invention relates to illuminated railings and more particularly pertains to a new illuminated railing system for locating a hand railing in low light conditions.

2. Description of the Prior Art

The use of illuminated railings is known in the prior art. More specifically, illuminated railings heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,161,769; U.S. Pat. No. 5,450,299; U.S. Pat. No. 5,325,272; U.S. Pat. No. 3,569,689; U.S. Pat. No. 356,382; and U.S. Pat. No. 3,131,871.

While these devices fulfill their respective, particular objectives and requirements, the aforementioned patents do not disclose a new illuminated railing system. The inventive device includes a plurality of posts including at least one end post and at least one middle post. The end post has an opening adjacent the upper end of the end post. The middle post has a pair of opposite openings adjacent the upper end of the middle post. One end of a generally transparent hand railing is inserted into the opening of the end post. Another end of the hand railing is inserted into one of the openings of the middle post. A plurality of elongate optical fibers are extended through the hand railing between the ends of the hand railing. The end post has a light source mounted therein adjacent opening of the end post.

In these respects, the illuminated railing system according to the present invention substantially departs from the conventional concepts and designs of the prior art, and in so doing provides an apparatus primarily developed for the purpose of locating a hand railing in low light conditions.

SUMMARY OF THE INVENTION

In view of the foregoing disadvantages inherent in the known types of illuminated railings now present in the prior art, the present invention provides a new illuminated railing system construction wherein the same can be utilized for locating a hand railing in low light conditions.

The general purpose of the present invention, which will be described subsequently in greater detail, is to provide a new illuminated railing system apparatus and method which has many of the advantages of the illuminated railings mentioned heretofore and many novel features that result in a new illuminated railing system which is not anticipated, rendered obvious, suggested, or even implied by any of the prior art illuminated railings, either alone or in any combination thereof.

To attain this, the present invention generally comprises a plurality of posts including at least one end post and at least one middle post. The end post has an opening adjacent the upper end of the end post. The middle post has a pair of opposite openings adjacent the upper end of the middle post. One end of a generally transparent hand railing is inserted into the opening of the end post. Another end of the hand railing is inserted into one of the openings of the middle post. A plurality of elongate optical fibers are extended through the hand railing between the ends of the hand railing. The end post has a light source mounted therein adjacent opening of the end post.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated railing system apparatus and method which has many of the advantages of the illuminated railings mentioned heretofore and many novel features that result in a new illuminated railing system which is not anticipated, rendered obvious, suggested, or even implied by any of the prior art illuminated railings, either alone or in any combination thereof.

It is another object of the present invention to provide a new illuminated railing system which may be easily and efficiently manufactured and marketed.

It is a further object of the present invention to provide a new illuminated railing system which is of a durable and reliable construction.

An even further object of the present invention is to provide a new illuminated railing system which is susceptible of a low cost of manufacture with regard to both materials and labor, and which accordingly is then susceptible of low prices of sale to the consuming public, thereby making such illuminated railing system economically available to the buying public.

Still yet another object of the present invention is to provide a new illuminated railing system which provides in the apparatuses and methods of the prior art some of the advantages thereof, while simultaneously overcoming some of the disadvantages normally associated therewith.

Still another object of the present invention is to provide a new illuminated railing system for locating a hand railing in low light conditions.

Yet another object of the present invention is to provide a new illuminated railing system which includes a plurality of posts including at least one end post and at least one middle post. The end post has an opening adjacent the upper end of the end post. The middle post has a pair of opposite openings adjacent the upper end of the middle post. One end of a generally transparent hand railing is inserted into the opening of the end post. Another end of the hand railing is inserted into one of the openings of the middle post. A plurality of elongate optical fibers are extended through the hand railing between the ends of the hand railing. The end post has a light source mounted therein adjacent opening of the end post.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 7 thereof, a new illuminated railing system embodying the principles and concepts of the present invention and generally designated by the reference numeral 10 will be described.

As best illustrated in FIGS. 1 through 7, the illuminated railing system 10 generally comprises a plurality of posts including at least one end post and at least one middle post. The end post has an opening adjacent the upper end of the end post. The middle post has a pair of opposite openings adjacent the upper end of the middle post. One end of a generally transparent hand railing is inserted into the opening of the end post. Another end of the hand railing is inserted into one of the openings of the middle post. A plurality of elongate optical fibers are extended through the hand railing between the ends of the hand railing. The end post has a light source mounted therein adjacent opening of the end post.

In closer detail, the illuminated railing system 10 comprises a plurality of posts each has opposite upper and lower ends, and a longitudinal axis extending between the upper and lower ends of the respective post. In use, the lower ends of the posts are designed for attachment to a floor structure such that the post extend away from the floor structure. Optionally, the lower ends of the post each may have a mounting plate coupled thereto so that the lower ends of the posts may be mounted to a wall structure by extending fasteners through the associated mounting plate into the wall structure so that the longitudinal axes of the posts extended generally perpendicular to the wall structure. In this embodiment, the lengths of the posts are typically substantially shorter than the lengths of floor mounted posts. The plurality of posts include at least one end post 11 and at least one middle post 12.

Figure 1:
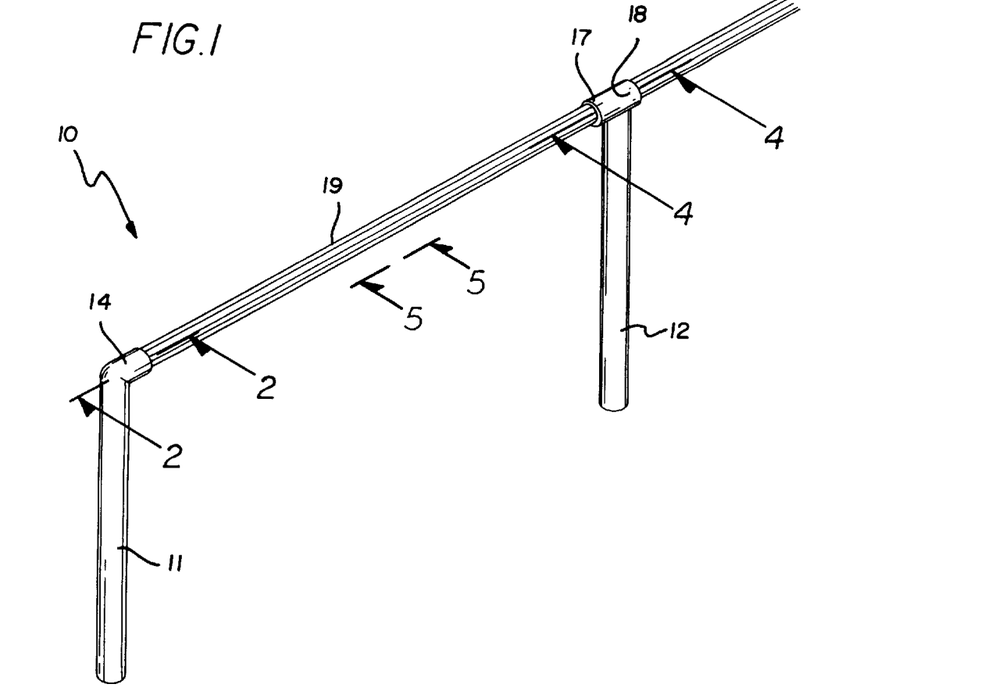
FIG. 1 is a schematic perspective view of a new illuminated railing system according to the present invention.
Figure 2:
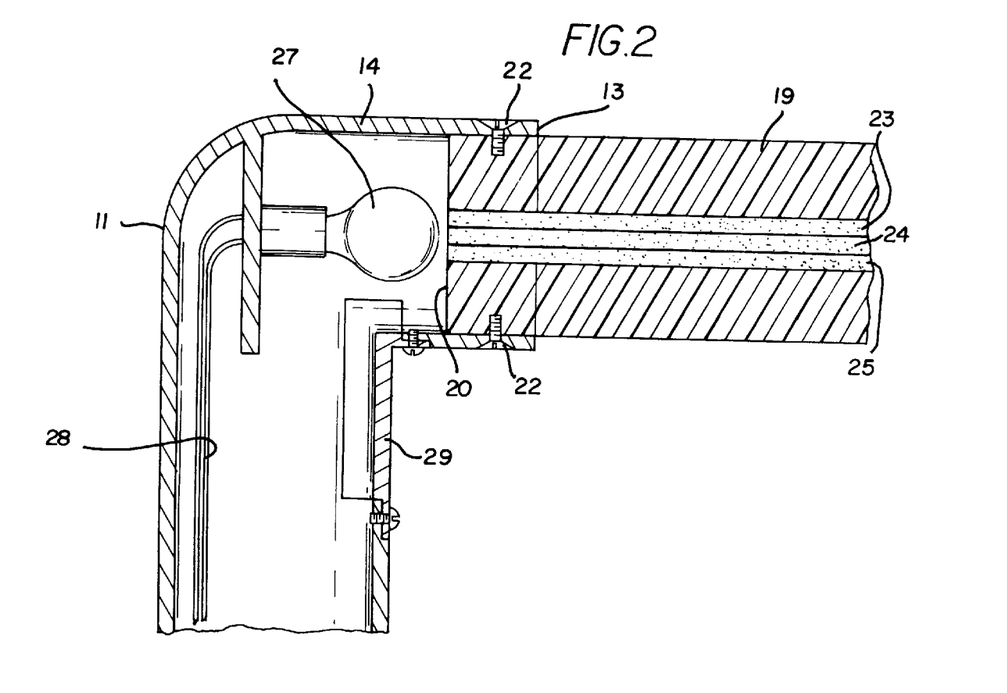
FIG. 2 is a schematic cross sectional view of an end post of the present invention taken from line 2—2 of FIG. 1.

As illustrated in FIG. 2, the end post has a generally circular opening 13 adjacent the upper end of the end post. The opening of the end post has a center lying along an axis preferably extending generally perpendicular to the longitudinal axis of the end post. In a preferred embodiment, the upper end of the end post is generally L-shaped such that the upper end of the end post has a generally cylindrical connecting portion 14 outwardly extending therefrom. The connecting portion has a longitudinal axis extending generally perpendicular to the longitudinal axis of the end post. The opening of the end post is located in the connecting portion of the end post.

Figure 4:
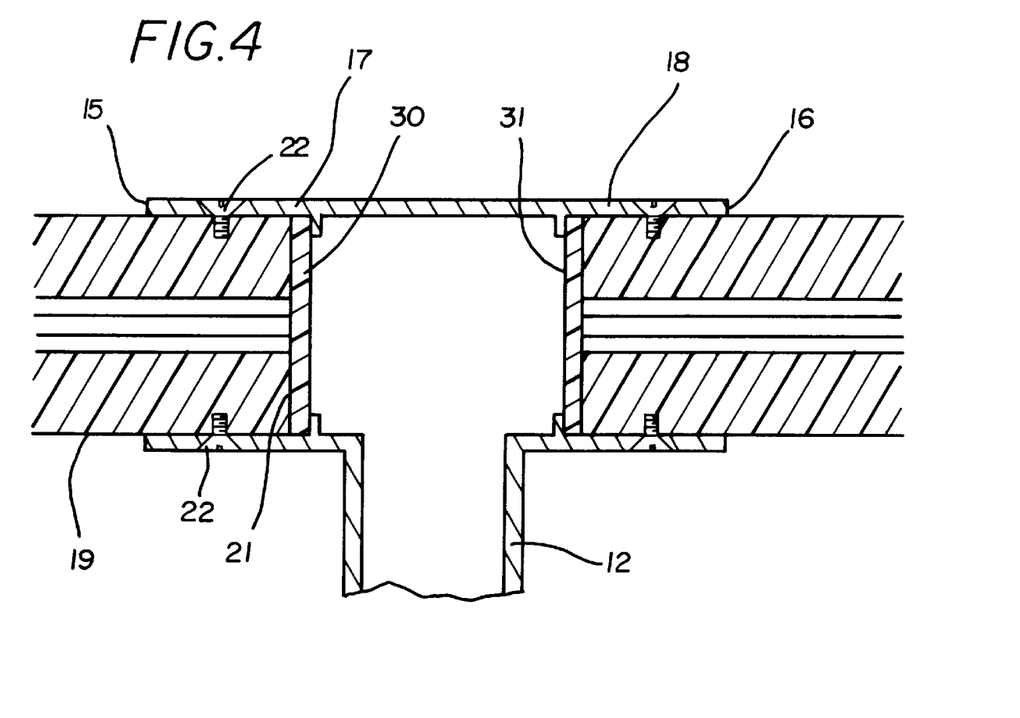
FIG. 4 is a schematic cross sectional view of an middle post of the present invention taken from line 4—4 of FIG. 1.

As illustrated in FIG. 4, the middle post has an opposite pair of generally circular openings 15,16 adjacent the upper end of the middle post. The openings of the middle post have coaxial centers lying along an axis extending generally perpendicular to the longitudinal axis of the middle post. Preferably, the upper end of the middle post is generally T-shaped such that the upper end of the middle post has a pair of generally cylindrical outwardly extending opposite connecting arms 17,18. Each of the connecting arms has a longitudinal axis extending generally perpendicular to the longitudinal axis of the middle post. One of the openings of the middle post is located in one of the connecting arms of the middle post and the other opening of the middle post is located in the other connecting arm of the middle post.

As illustrated in FIGS. 1, 2, 5, and 6, at least one generally cylindrical elongate hand railing 19 is provided having a pair of generally circular opposite ends 20,21. The hand railing has a longitudinal axis extending between the ends of the hand railing, and an outer circumference substantially perpendicular to the longitudinal axis of the hand railing. One of the ends of the hand railing is inserted into the opening of the end post. The other of the ends of the hand railing is inserted into one of the openings of the middle post. Ideally, threaded fasteners 22 couple the ends of the hand railing to the associated post. The hand railing comprises a generally transparent material such as a transparent thermoplastic material (for example, the transparent thermoplastic sold under the trade name PLEXIGLASS).

As illustrated in FIGS. 2, 3, 4, and 6 a plurality of elongate optical fibers 23,24,25 are extended through the hand railing between the ends of the hand railing. Each of the optical fibers has a pair of opposite ends. One end of each optical fiber is positioned at one end of the hand railing and the other end of each optical fiber is positioned at the other end of the hand railing. The optical fibers are preferably, extended substantially parallel to the longitudinal axis of the hand railing. Ideally, the optical fibers is positioned adjacent the longitudinal axis of the hand railing. Optimally, three optical fibers are provided in an axial bore 26 in the hand railing extending between the ends of the hand railing coaxial with the longitudinal axis of the hand railing.

In a preferred embodiment, with reference to FIGS. 2 and 4, the end post has a light source 27, such as a light bulb, mounted therein adjacent opening of the end post. The light source of the end post is positioned adjacent the end of the hand railing inserted into the opening of the end post so that light from the light source is shined into the adjacent ends of the optical fibers and the adjacent end of the hand railing. The light source is electrically connect with wires 28 in the end post to a power supply of the structure. Preferably, the end post has an detachable access panel 29 adjacent the upper end of the end post to provide access to the light source of the end post for convenient repair and replacement. In this preferred embodiment, each connecting arm of the middle post has a mirror 30,31 mounted therein. As illustrated, the mirrors abut the end of the hand railing inserted into the respective opening of the middle post. Each mirror has a light reflective face facing the associated end of the hand railing to reflect light back into the adjacent hand railing and optical fibers.

Figure 3:
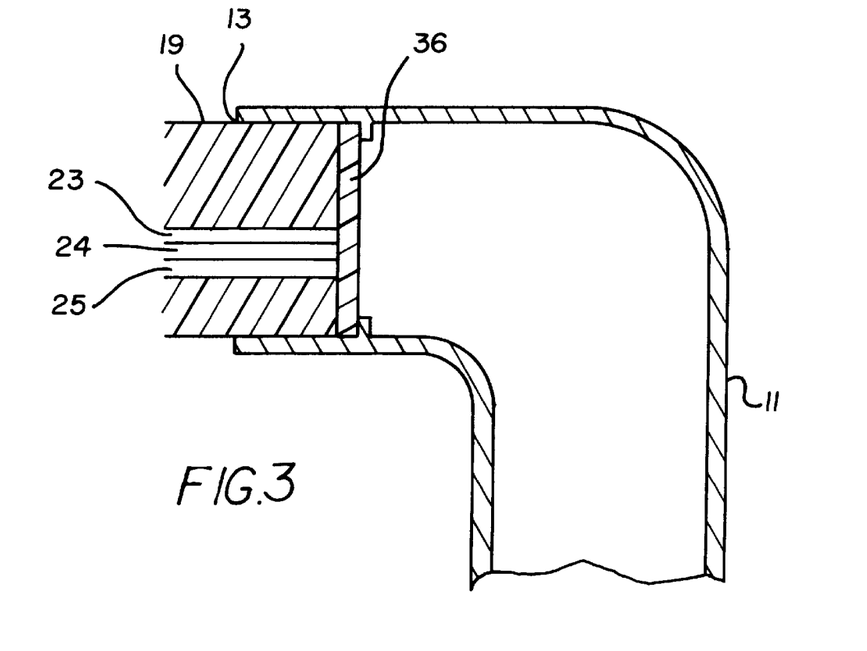
FIG. 3 is a schematic cross sectional view of a configuration of an end rail with a mirror therein instead of a light source.
Figure 7:
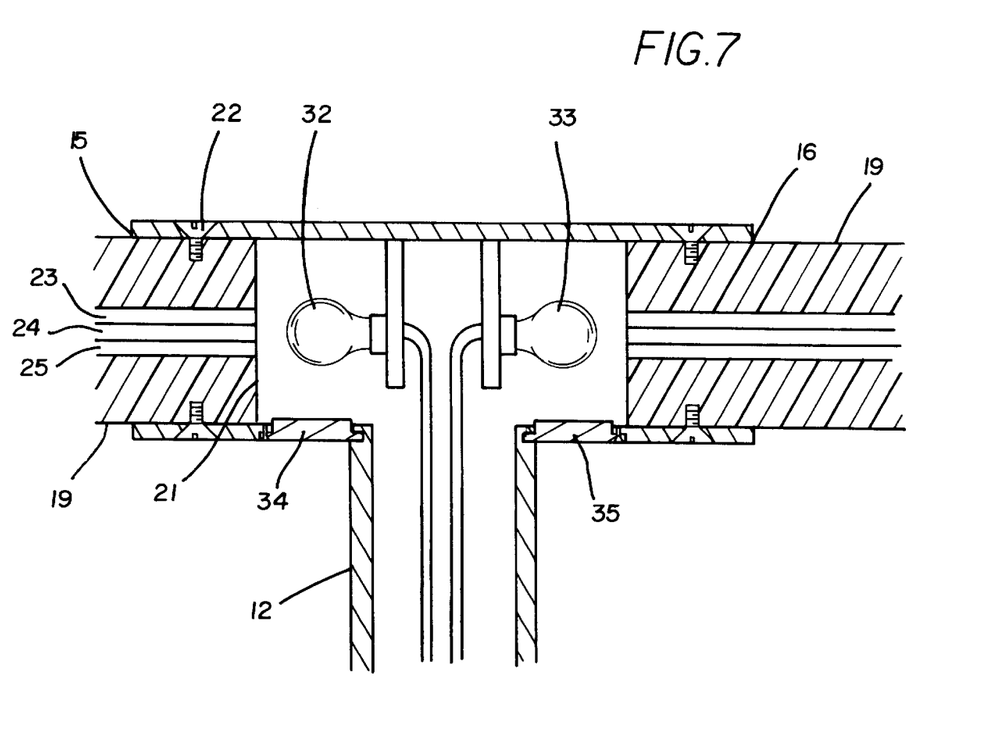
FIG. 7 is a schematic cross sectional view of a configuration of a middle post with light sources provided therein instead of mirrors.

Additionally, as illustrated in FIGS. 3 and 7, end and middle posts may be included in the system with the locations of the light sources and mirrors reversed. In particular, as shown in FIG. 7, the middle post in this configuration has a pair of light sources 32,33 mounted therein with one of the light sources positioned adjacent one of the openings of the middle post and the other light source positioned adjacent the other opening of the middle post. The middle post preferably has an access panel 34,35 into each of the connecting arms to provide access to the light sources of the middle post. In this configuration, the end post has a mirror 36 mounted therein with the mirror preferably abutting the end of a hand railing inserted into the opening of the end post. In this configuration, the mirror of the end post has a light reflective face facing the associated end of the hand railing to reflect light back into the hand railing and optical fibers.

Figure 5:
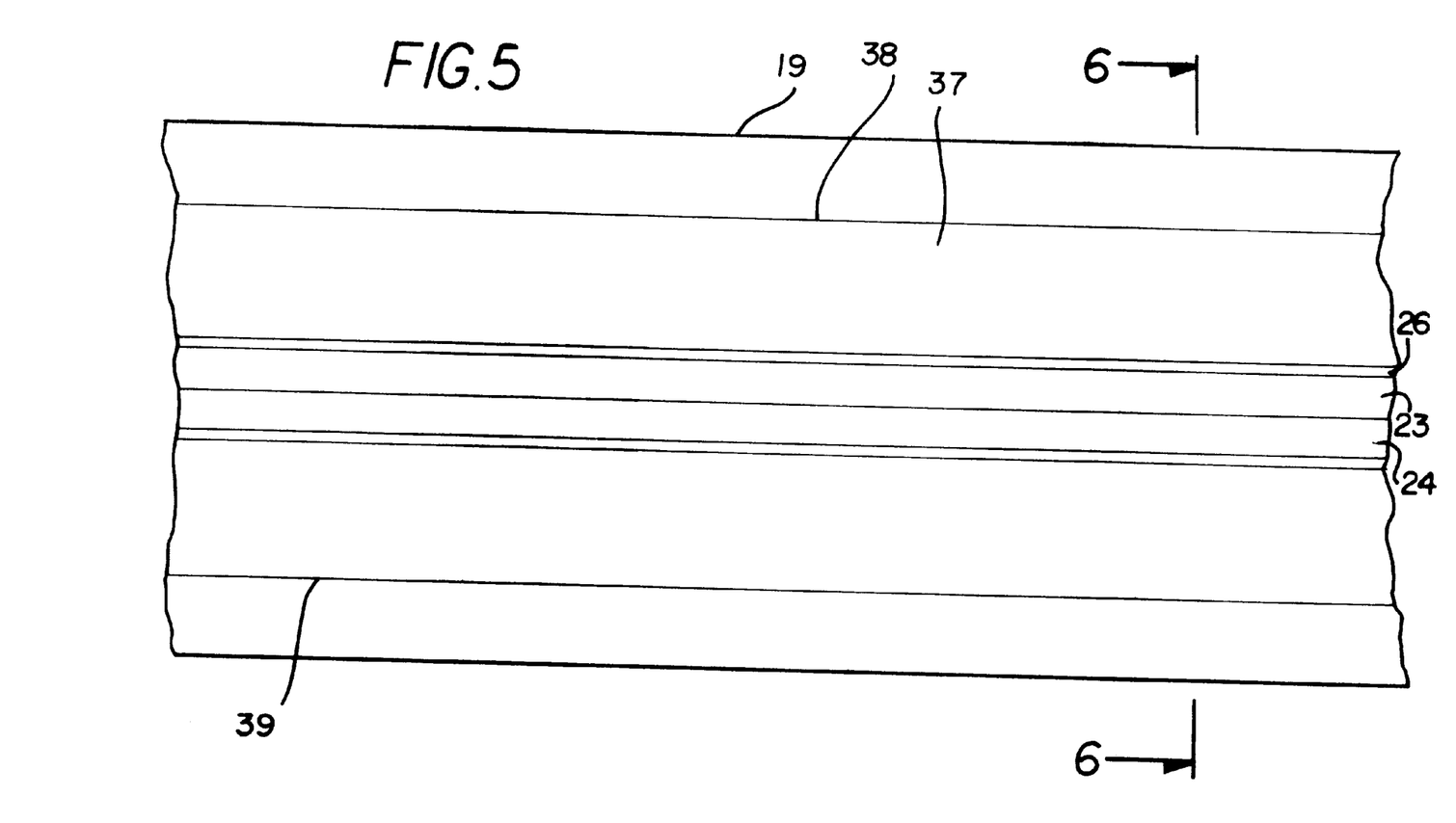
FIG. 5 is a schematic side view of the hand railing taken from the vantage of line 5—5 of FIG. 1.
Figure 6:
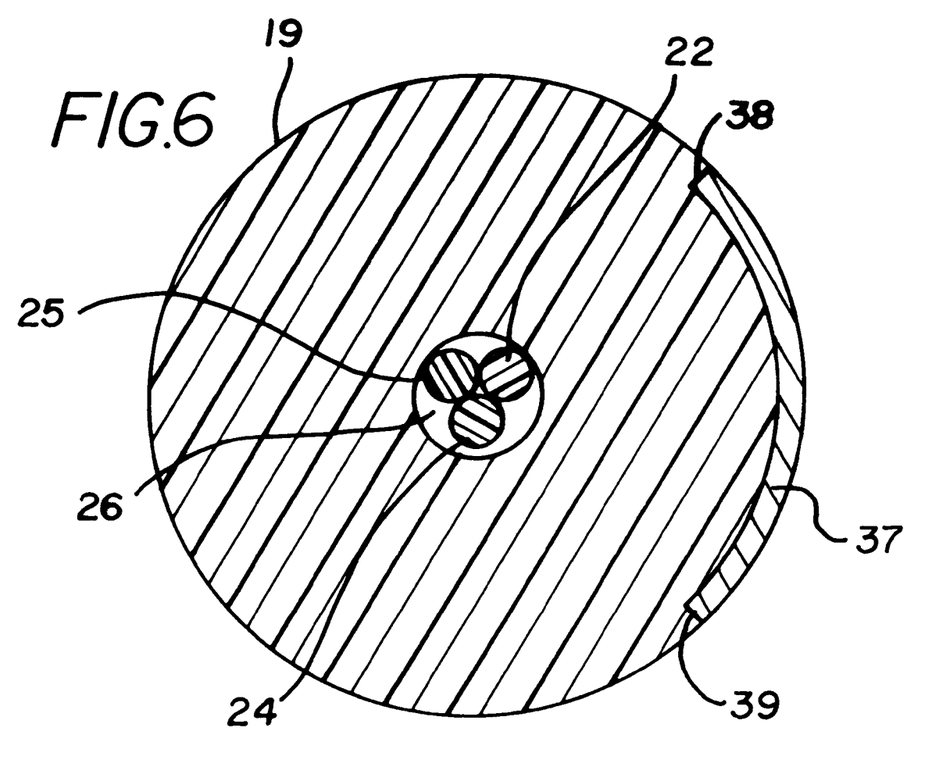
FIG. 6 is a schematic cross sectional view of the hand railing taken from line 6—6 of FIG. 5.

Preferably, with reference to FIGS. 5 and 6, the hand railing has an arcuate light reflecting surface 37 provided on an arcuate sheet therein adjacent the outer circumference of the hand railing. The light reflecting surface of the hand railing faces radially inwards towards the longitudinal axis of the hand railing. The light reflecting surface of the hand railing has a pair of opposite end edges, and a pair of side edges 38,39 extending between the end edges of the light reflecting surface of the hand railing. The light reflecting surface of the hand railing is extended between the ends of the hand railing such that one of the end edges of the light reflective surface of the hand railing is positioned adjacent one end of the hand railing and the other end of the light reflective surface of the hand railing is positioned adjacent the other end of the hand railing.

The side edges of the light reflecting surface of the hand railing define an arc therebetween less than one-half of the outer circumference of the hand railing. Ideally, the arc of the light reflecting surface of the hand railing is about one-fourth the outer circumference of the hand railing. In other words, the side edges of the light reflecting surface of the hand railing define an arc therebetween has an angle of curvature at the longitudinal axis of the of about 45 degrees.

In use, the light reflecting surface of the hand railing is designed for reflecting light radiating from the optical fibers and the hand railing in the desired direction away from the light reflecting surface of the hand railing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated railing system, comprising:
    a plurality of posts each having opposite upper and lower ends, and a longitudinal axis extending between said upper and lower ends of the respective post;
    said plurality of posts including an end post and a middle post;
    said end post having an opening adjacent said upper end of said end post;
    said middle post having a pair of opposite openings adjacent said upper end of said middle post;
    an elongate hand railing having a pair of opposite ends, one of said ends of said hand railing being inserted into said opening of said end post, the other of said ends of said hand railing being inserted into one of said openings of said middle post;
    said hand railing comprising a generally transparent material;
    said hand railing having a longitudinal axis extending between said ends of said hand railing, and an outer circumference substantially perpendicular to said longitudinal axis of said hand railing;
    a plurality of elongate optical fibers being extended through said hand railing between said ends of said hand railing; and
    said end post having a light source mounted therein adjacent opening of said end post.

2. The illuminated railing system of claim 1, wherein said upper end of said end post is generally L-shaped such that said upper end of said end post has a generally cylindrical connecting portion outwardly extending therefrom, said connecting portion having a longitudinal axis extending generally perpendicular to said longitudinal axis of said end post, said opening of said end post being located in said connecting portion of said end post.

3. The illuminated railing system of claim 1, wherein said upper end of said middle post is generally T-shaped such that said upper end of said middle post has a pair of generally cylindrical outwardly extending opposite connecting arms, each of said connecting arms having a longitudinal axis extending generally perpendicular to said longitudinal axis of said middle post, one of said opening of said middle post being located in one of said connecting arms of said middle post, another of said openings of said middle post being located in another of said connecting arms of said middle post.

4. The illuminated railing system of claim 1, wherein threaded fasteners couple said ends of said hand railing to the associated post.

5. The illuminated railing system of claim 1, wherein each of said optical fibers has a pair of opposite ends, one end of each optical fiber being positioned at one end of said hand railing the other end of each optical fiber being positioned at the other end of said hand railing, said optical fibers being extended substantially parallel to said longitudinal axis of said hand railing.

6. The illuminated railing system of claim 5, wherein said optical fibers are positioned adjacent said longitudinal axis of said hand railing.

7. The illuminated railing system of claim 1, wherein said end post has an access panel adjacent said upper end of said end post.

8. The illuminated railing system of claim 1, wherein said middle post has a mirror mounted therein, said mirror having a light reflective face facing the associated end of said hand railing to reflect light back into the hand railing and optical fibers.

9. The illuminated railing system of claim 8, wherein said mirror abuts the end of said hand railing inserted into said opening of said middle post.

10. The illuminated railing system of claim 1, wherein said hand railing has an arcuate light reflecting surface therein adjacent said outer circumference of said hand railing, said light reflecting surface of said hand railing facing radially inwards towards said longitudinal axis of said hand railing.

11. The illuminated railing system of claim 10, wherein said light reflecting surface of said hand railing has a pair of opposite end edges, and a pair of side edges extending between said end edges of said light reflecting surface of said hand railing, said light reflecting surface of said hand railing being extended between said ends of said hand railing such that one of said end edges of said light reflective surface of said hand railing is positioned adjacent one end of said hand railing and the other end of said light reflective surface of said hand railing is positioned adjacent the other end of said hand railing.

12. The illuminated railing system of claim 11, wherein said side edges of said light reflecting surface of said hand railing define an arc therebetween less than one-half of said outer circumference of said hand railing.

13. The illuminated railing system of claim 12, wherein said arc of said light reflecting surface of said hand railing is about one-fourth said outer circumference of said hand railing.

14. An illuminated railing system, comprising:
   a plurality of posts each having opposite upper and lower ends, and a longitudinal axis extending between said upper and lower ends of the respective post;
   said plurality of posts including an end post and a middle post;
   said end post having a generally circular opening adjacent said upper end of said end post, said opening of said end post having a center lying along an axis extending generally perpendicular to said longitudinal axis of said end post;
   said upper end of said end post being generally L-shaped such that said upper end of said end post has a generally cylindrical connecting portion outwardly extending therefrom, said connecting portion having a longitudinal axis extending generally perpendicular to said longitudinal axis of said end post;
   said opening of said end post being located in said connecting portion of said end post;
   said middle post having a opposite pair of generally circular openings adjacent said upper end of said middle post, said openings of said middle post having coaxial centers lying along an axis extending generally perpendicular to said longitudinal axis of said middle post;
   said upper end of said middle post being generally T-shaped such that said upper end of said middle post has a pair of generally cylindrical outwardly extending opposite connecting arms, each of said connecting arms having a longitudinal axis extending generally perpendicular to said longitudinal axis of said middle post;
   one of said opening of said middle post being located in one of said connecting arms of said middle post, another of said openings of said middle post being located in another of said connecting arms of said middle post;
   a generally cylindrical elongate hand railing having a pair of generally circular opposite ends, one of said ends of said hand railing being inserted into said opening of said end post, the other of said ends of said hand railing being inserted into one of said openings of said middle post;
   wherein threaded fasteners couple said ends of said hand railing to the associated post;
   said hand railing comprising a generally transparent material;
   said hand railing having a longitudinal axis extending between said ends of said hand railing, and an outer circumference substantially perpendicular to said longitudinal axis of said hand railing;
   a plurality of elongate optical fibers being extended through said hand railing between said ends of said hand railing, each of said optical fibers having a pair of opposite ends, one end of each optical fiber being positioned at one end of said hand railing the other end of each optical fiber being positioned at the other end of said hand railing;
   said optical fibers being extended substantially parallel to said longitudinal axis of said hand railing, said optical fibers being positioned adjacent said longitudinal axis of said hand railing;
   said end post having a light source mounted therein adjacent opening of said end post, said light source of said end post being positioned adjacent the end of said hand railing inserted into said opening of said end post so that light from said light source is shined into the adjacent ends of said optical fibers and the adjacent end of said hand railing;
   said end post having an access panel adjacent said upper end of said end post;
   said middle post having a mirror mounted therein, said mirror abutting the end of said hand railing inserted into said opening of said middle post;
   said mirror having a light reflective face facing the associated end of said hand railing to reflect light back into the hand railing and optical fibers;
   said hand railing having an arcuate light reflecting surface therein adjacent said outer circumference of said hand railing, said light reflecting surface of said hand railing facing radially inwards towards said longitudinal axis of said hand railing;
   said light reflecting surface of said hand railing having a pair of opposite end edges, and a pair of side edges extending between said end edges of said light reflecting surface of said hand railing;
   said light reflecting surface of said hand railing being extended between said ends of said hand railing such that one of said end edges of said light reflective surface of said hand railing is positioned adjacent one end of said hand railing and the other end of said light reflective surface of said hand railing is positioned adjacent the other end of said hand railing; and said side edges of said light reflecting surface of said hand railing defining an arc therebetween less than one-half of said outer circumference of said hand railing.

* * * * *